April 18, 1961  J. D. CLANTON, JR., ET AL  2,980,909
REDUCED-HEIGHT RADOME-ANTENNA
Filed Dec. 3, 1956  4 Sheets-Sheet 1

INVENTORS.
James D. Clanton
Earl H. Flath
Edwin G. Keiffer

BY Henry C. Goldwire
AGENT

INVENTORS.
James D. Clanton
Earl H. Flath
Edwin G. Keiffer

BY Henry C. Goldwire
AGENT

April 18, 1961  J. D. CLANTON, JR., ET AL  2,980,909
REDUCED-HEIGHT RADOME-ANTENNA
Filed Dec. 3, 1956  4 Sheets-Sheet 3

INVENTORS.
James D. Clanton
Earl H. Flath
Edwin G. Keiffer
BY Henry C. Foldwire
AGENT April 18, 1961     J. D. CLANTON, JR., ET AL     2,980,909
REDUCED-HEIGHT RADOME-ANTENNA Filed Dec. 3, 1956                                 4 Sheets-Sheet 4

INVENTORS.
James D. Clanton
Earl H. Flath
Edwin G. Keiffer

BY J Henry C. Goldwire
AGENT

United States Patent Office 2,980,909
Patented Apr. 18, 1961

2,980,909

REDUCED-HEIGHT RADOME-ANTENNA

James D. Clanton, Jr., Arlington, and Earl H. Flath, Jr., and Edwin G. Keiffer, Dallas, Tex., assignors to Chance Vought Corporation, a corporation of Delaware Filed Dec. 3, 1956, Ser. No. 626,802

19 Claims. (Cl. 343—705)

This invention relates to antennas for the transmission and reception of electromagnetic energy, and more particularly to an integral radome-antenna structure wherein an improved antenna is combined with a fairing provided therefor to form a unitary structure of aerodynamic, electromagnetic, and other advantages hereinafter enumerated.

Present-day practice in the mounting of antennas, particularly in the case of aircraft utilizing radar for search and detection, generally requires the main body of an antenna to be spaced by a considerable interval from the earth or from a fuselage or other body on which it is carried. For reasons including the protection of the antenna and the minimization of its air-drag, such an antenna is preferably housed in an enclosure, termed a radome, which is substantially transparent to radiated electromagnetic energies.

The radome has tended to take the form of a hollow structure enclosing the antenna, which was rotatable therein. The radome was carried by and rigidly fastened to a supporting structure which, as the case may be, was a land- or air-supported vehicle or a tower or similar structure mounted on the earth, a building, or a ship. Certain disadvantages were inherent in this arrangement. For one, the radome necessarily extended out from the supporting structure a considerable distance in order to enclose the antenna, and thus had a very large vertical dimension. Further, for rotation of the antenna therein, the inner cavity of the radome was necessarily large enough to provide the necessary clearances. Consequently, although occupied in its entirety during the course of a complete oscillation or revolution of the antenna, most of the interior space of the radome at any given instant was, in a sense, wasted, but was required nonetheless to provide antenna clearance. This, among other factors, contributed to the necessity of a radome of great bulk and more than correspondingly great weight. Particularly where the radome was air-craft mounted, it was necessary either to provide bulky and heavy inner reinforcing or supporting members in the radome or to make its walls excessively thick in order that it might have the strength required to withstand air loads, etc. Thick walls were the generally utilized mode of constructing a radome of adequate strength because of the severe disadvantages of internal reinforcing and supporting members. Besides contributing to the over-all weight and bulk of the radome, these members had to be made of materials which would not interfere with radiation, and distressing problems were encountered in accomplishing their placement out of the path of the rotating antenna. Being large and heavy, an air-borne radome presented serious problems of placement on the aircraft. Weight and balance considerations sometimes dictated the placing of the radome in one location, while still other locations might be best from the standpoints of aircraft stability, the location of related radar equipment, the influence of the airframe on the radiation pattern, etc. Aerodynamic drag of the horizontally as well as vertically large radome was high and tended to limit severely the performance and flight duration capabilities of the aircraft. Not the least of such problems were those in connection with handling and storage occasioned by the considerable extension of the antenna and radome from the aircraft.

Some betterment of the fineness ratio of the radome and reduction of the wastage of its internal volume have previously been accomplished by making the radome in the form of a thick disc (or circular airfoil) rotatably mounted on a pylon at a low or zero angle of incidence to the relative wind. The antenna is rigidly mounted in the radome and rotates with the latter. With such an arrangement, more simple and effective placement of internal reinforcing members is made possible since problems of interference are minimized; and some lessening of drag, mitigation of stability problems, and reduction of weight are effected.

When such a radome served search and detection functions, its diameter and over-all thickness, hence its frontal area and aerodynamic drag, have until the present invention been so disadvantageously large as to present painfully serious problems in the design and operation of the aircraft on which the radome was mounted. Worthwhile reduction of the over-all thickness and/or diameter of the radome was possible only by effecting reductions in the size of the antenna housed thereby, and this was ruled out because of concomitant and intolerable diminutions of antenna capabilities. Various antennas useful, for instance, with search radar equipment and used or considered for use in a disc-like radome include: a broadside array of dipoles; a symmetrical or asymmetrical cylindrical parabola with dipole, horn, or line feed; a paraboloidal reflector with horn feed; and a broadside array of slots fed by a waveguide. An example may be given of the considerable proportions enforced on the radome by these antennas: in satisfying a particular, yet not at all unusual, set of antenna performance standards, it was found that each of the above antennas, because of its size, required a radome roughly 10 feet thick and at least 30 feet in diameter. Reduction in antenna and radome size were not possible, since they would have resulted in substandard operation of the antenna. Any reduction in antenna thickness, for example, would have reduced antenna gain and increased the vertical width of the radiated beam. Generally undesirable in still other respects, the vertically widened beam impinged more directly on the aircraft and distortion of the radiation pattern was in consequence excessive. Accordingly, the radiation center of the antenna was necessarily moved still further from the aircraft by extending the pylon or faired support on which the radome was mounted. Because of the radome thickness and the great interval between the aircraft and the antenna radiation center, the radome extended such a distance from the aircraft that ground interference precluded bottom-side mounting on the aircraft, and even top-side mounting presented prohibitively serious handling and storage problems which were particularly acute where it was hoped to provide an aircraft suitable for storage on and operation from aircraft carriers: not enough head-room was available, even on the largest hangar decks, to accommodate a radome extending so high above the aircraft. In addition, of course, the large frontal area of the radome was bound to create much drag, and flight stability of the aircraft was penalized. An example will be given of the massive proportions enforced on these antennas and on the radomes therefor: in satisfying the not at all unusual or excessive demands of certain classes of radar search equipment in order that the later might successfully accomplish at least the minimum requirements of their highly important missions, each of the above antennas must have a vertical dimension of roughly 7 feet, while its greatest horizontal dimension must be approximately 23 feet. Constructional considerations and the thick walls required in the radome for any one of these antennas necessitate the typical radome dimensions already quoted. It will be noted that, even with so large a diameter as quoted, the diameter is still so small in comparison with the great thickness that the resulting fineness ratio of the radome is not at all desirable from an aerodynamic standpoint.

The thickness of its walls (that is, the gage of the material from which its walls are made) is of course an important factor controlling not only the total thickness but also the total weight of the radome. Since a discoid radome of the above-mentioned type must bear not only the gravitational forces exerted on the antenna contained therein but must also bear all gravitational and aerodynamic forces exerted on itself, it cannot be made with relatively very thin walls. Yet, if the walls, in their portions illuminated by the antenna, are not "very thin," they will contribute heavily to refraction and reflection of the radar waves (with consequent distortion of the radiation pattern and drastic reduction in transmission efficiency) unless the wall thickness is increased to a value equal to one-half wavelength in the wall material. At a representative frequency of 425 megacycles, this thickness, when the radome wall is made of a representative material commonly used for such constructions, is in excess of 6 inches. Walls of such thickness, as would be expected, are of comparatively enormous weight, and the use of thinner walls would be tremendously advantageous. Experience has shown, however, that a thinner wall may be employed only where wall thickness is $$<< \frac{\lambda}{4\sqrt{\epsilon}}$$

where $\lambda$ is a free-space wavelength at the antenna operating frequency and $\epsilon$ is the dielectric constant of the radome wall; and reasons of structural strength have herebefore tended to forbid the use of walls of such small thickness (much less than 2 inches when the operating frequency is 425 megacycles).

It thus may be seen that it is most desirable to provide, as is accomplished by the present invention, an antenna and disc radome therefor in which, with no sacrifice but rather with significant betterment of antenna performance, the thickness of the radome is greatly reduced concurrently with significant reduction in radome diameter and weight. It is to be desired that the radome wall be generally much less than two inches in thicknesses, for instance, in the neighborhood of 0.25 inch. Thus, improved, the radome adds much less to the over-all drag of the aircraft and creates less turbulence in air flowing downstream from the radome over stabilizing and/or control surfaces, thereby improving aircraft stability. The lessened mass of the radome mitigates placement problems of the antenna and radome on the airframe by facilitating the solutions of problems of weight, balance, aerodynamic stability, etc. Even when the radiation center of the antenna is separated from the aircraft body by as wide an interval as would generally be the case with previously used antennas, the antenna and radome, being thin, do not extend nearly so far above the radiation center; hence, the aircraft's vertical dimension is reduced, thus facilitating its handling and storage. By the same token, the thinner radome does not extend so far below the radiation center, and radome thickness is replaced by extra length of a pylon by which the radome is mounted on the airframe. Since such pylons may be relatively thin and commonly are shaped in the manner of a symmetrical airfoil, the pylon functions as a stabilizer, and the added pylon length adds to the stability of the aircraft. Because the lessened drag and weight permit flight at higher speeds and altitudes and tend to foster lower fuel consumption rates and an increase in maximum flight time, the antenna and radome may be carried on a considerably smaller aircraft. On the other hand, the antenna dimensions may be increased, if desired, to require a radome up to or above a diameter such as formerly was necessary without exceeding the limitations of weight, drag, overall height, etc. formerly experienced. Consequently, an antenna of still further improved operating values (for instance, considerably further increase in range and refinement of radiation pattern) may be carried on the aircraft.

It is, accordingly, a major object of the invention to provide an antenna suitable for uses including search radar applications and the like and which, while being relatively very thin in a vertical sense, is capable of radiation in a pattern exhibiting advantageously narrow beamwidths in elevation and in azimuth.

Another object is to provide an antenna such as stated above in which efficient means for control of azimuthal beamwidth are combined with novel and highly effective means for control of beamwidth in elevation.

A further object is to provide, for an antenna, a radome which is relatively very thin in a vertical sense, of reduced diameter, and of low aerodynamic drag.

Yet another object is to provide a radome of the character stated above in which the walls are relatively very thin and which is relatively very light in weight.

An additional object is to provide an antenna with highly effective utilization of its total aperture, that is, an antenna whose aperture is most efficiently illuminated, and which, in radar use, is capable of detecting targets at long ranges.

A still further object is to provide an antenna such as thus far stated which is relatively strong and rigid in construction, in performance highly superior to previously utilized antennas of similar vertical dimension, and integrally united with a radome such as characterized above into a single structure wherein reinforcing and supporting members are provided by the antenna.

Still another object of the invention is to provide an antenna-radome structure which is of reduced diameter but still of greatly improved fineness ratio.

An additional object is to provide an antenna-radome structure such as stated above which may be rotatably mounted on an aircraft in a manner effecting little or no increase in the over-all height of the aircraft and which at the same time is much improved in regard to the effect of the radome on the in-flight stability of the aircraft.

Another object is to provide an antenna-radome structure which has much less effect on the performance and endurance of the aircraft on which it is carried than do previous radomes housing antennas of comparable radiation characteristics, and which consequently may be carried, if desired, on a much smaller aircraft.

Other objects and advantages will be apparent from the specifications and claims and from the accompanying drawings which illustrate a preferred embodiment of the invention.

Briefly stated, the present invention comprises a radome-antenna structure including a relatively greatly miniaturized and highly efficient antenna covered by and providing structural support and reinforcement for a radome, with which the antenna is rigidly combined. The antenna includes a horizontally disposed broadside array of horizontally polarized slots fed by a rectangular waveguide and radiating into horizontally disposed horns electromagnetically open, on their upper and lower sides, to free space. The vertical dimension of the waveguide is greatly reduced, relative to an air-filled waveguide having the same phase-velocity, and a corresponding reduction is thus made possible in radome thickness and diameter. Phase velocity within the waveguide is controlled by the introduction into the guide cavity of a ridge extending longitudinally along the back wall thereof. Each horn has flared portions at its throat and outer ends which are connected by a straight or non-flared portion in which the horn walls are substantially parallel, and the horn walls are provided with retarding means including surface discontinuities, for example, slots, to form retarding surfaces which are more particularly described in later paragraphs. The azimuth pattern of the antenna is primarily a function of the length of the broadside array of waveguide-fed slots, with some significant reduction of azimuthal beamwidth and side lobe level being obtained, through pattern multiplication, by action of the retarding surfaces. The elevation pattern is readily controlled by the retarding surfaces, and is a function of retarding surface length. The antenna-radome structure may be rotatably mounted on a tower extending above the ground, a building or ship, etc., and may be mounted on an aircraft or other vehicle by a pylon extending a suitable distance outwardly from the vehicle. Means are provided for rotating the radome-antenna structure and for connecting the antenna to receiving and/or transmitting equipment with which it may be associated. The antenna is of rake-like form, and the radome with which it is structurally united fits close against its upper and lower sides. The outer shape of the radome-antenna structure preferably is that of a symmetrical, circular airfoil.

Figure 1:
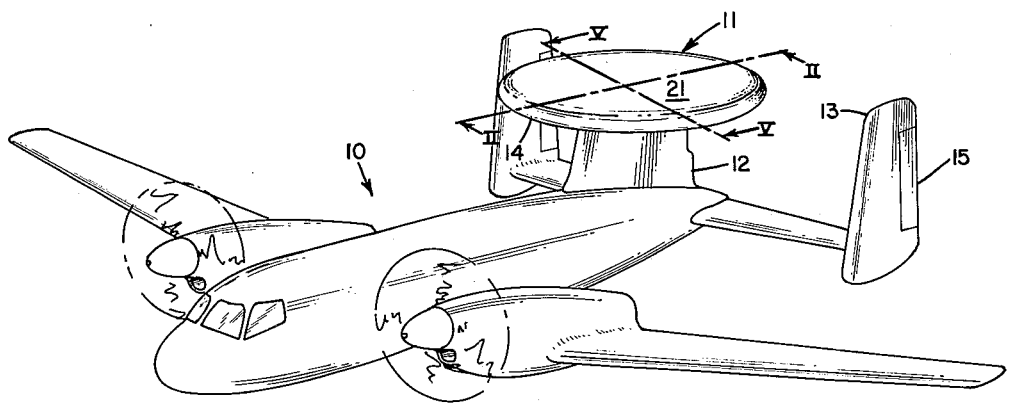
Figure 1 is a perspective view showing the radome-antenna structure mounted on an aircraft.

With reference now to Figure 1, 10 is an aircraft which is adapted for cruising for relatively long periods while carrying a circular radome-antenna structure 11 rotatably mounted thereon at the outer end of a fixed, outwardly extending pylon 12. To avoid problems of ground clearance and for electrical and aerodynamic reasons, it was found that, for the particular aircraft illustrated, the pylon 12 could most profitably be located above the fuselage of the aircraft 10 near the aft end thereof in such position that the center of the radome-antenna structure 11 is a little forward of the leading edges of the two laterally spaced vertical stabilizers 13 of the aircraft. The rigidly mounted pylon 12 is in the form of a vertical airfoil whose two faces are symmetrically disposed on either side of its chordplane, the latter being substantially at zero angle of incidence to the relative wind. The pylon 12 is proportioned to yield the least drag and best contribution to the directional stability of the aircraft 10 while offering entirely adequate support of the radome-antenna structure 11 at a chosen height above the aircraft. The pylon 12 must be long enough to locate the radome-antenna structure 11 somewhat above (or at the least not below) the height at which the largest tolerable distortion of the radiation pattern by the airframe is experienced.

To impose the least flight penalty on the aircraft 10, the antenna 38 (Figure 4) is made to the minimum dimensions necessary for meeting the electromagnetic requirements of the particular application. Ways in which these dimensions may be derived will be provided, and it will be found that the antenna 38, while capable of radiation in a pattern exhibiting advantageously narrow beamwidths in azimuth and in elevation, is relatively very thin in a vertical sense, and also is of reduced horizontal dimension. When the antenna dimensions have been determined, the proportions of the radome 21 (Figure 1) are then set: the radome is preferably made as thin as possible for housing the antenna and for providing good aerodynamic contours; similarly, its diameter is preferably an optimum compromise between maximum economy of housing the antenna and best aerodynamic shape. The radome 21 thus is relatively very thin in a vertical sense; of reduced diameter, it nonetheless is of greatly improved fineness ratio, and hence of much reduced aerodynamic drag. The radome edge 14, for best aerodynamic performance, preferably is tapered or rounded all around the radome periphery after the manner of the well-designed leading edge of, for example, an aircraft stabilizer. As, because of the thinness of the antenna housed therein, the upper and lower faces of the radome 21 need never be widely separated, this tapering or rounding of the edge 14 is accomplished efficiently in a relatively small diametric distance, whereas much more diametric distance would be required if the radome, as heretofore has been necessary, were a great deal thicker.

In the particular embodiment shown, a comparatively excellent radiation pattern was obtained when the radiation center of the antenna was spaced from the fuselage of the aircraft 10 to a degree that raised the top of the radome-antenna structure 11 substantially to the level of the tops of the two vertical stabilizers 13 which flank the radome-antenna structure 11. To obviate distortion of the antenna's radiation pattern by the vertical stabilizers 13 and the rudders 15 mounted thereon, the stabilizers and rudders, at least in their upper portions, are largely made of a material (for instance, a glass fiber cloth laminate) which is transparent to the radiated energies.

In order to endow it with sufficient strength and to provide room for the items (to be described) which are housed therein, the supporting pylon 12 should ordinarily be made somewhat thicker, in a lateral sense, than either of the vertical stabilizers 13. The chord of the pylon 12 preferably is long enough to provide it with a desirable fineness ratio for decrease of its drag and tendencies to create turbulence and for increase of its efficiency of action as a vertical stabilizer.

Figure 2:
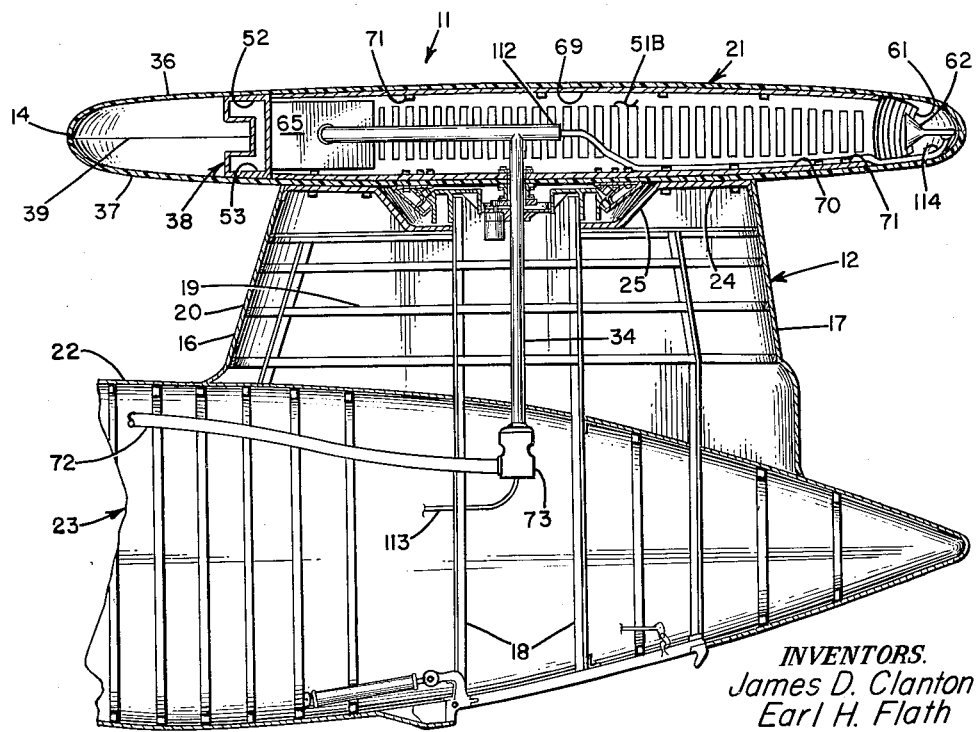
Figure 2 is a sectional view taken along line II—II of Figure 1 showing the radome-antenna structure, adjacent portions of the aircraft, and the mounting, rotating, and connecting means.

Thus, as shown in Figure 2, the pylon leading and trailing edges 16, 17 should define the longitudinal limits of a relatively low-drag aerodynamic body. Internally, the pylon 12 comprises a supporting framework made, for example, of vertical and horizontal members 18, 19 arranged to define the basic shape of the pylon. In the referenced figure, only the far-side framework members 18, 19 appear; matching near-side members are of course provided. The framework members 18, 19 are covered by an outer skin 20 which at the pylon's outer end is trimmed to match the lower contour of the radome 21 and which, around the pylon's lower end, is smoothly joined with the fuselage skin 22. Some of the vertical members 18 may extend into and may be attached to the fuselage 23, and other members 18 and 19 of the framework, also the pylon skin 20, may be attached to the fuselage 23 by any means which is convenient and efficient for rigidly fastening the pylon 12 on the fuselage in fixed relation thereto. The hollow interior of the pylon 12 preferably is substantially closed off at its lower end by the fuselage skin 22 and at its upper end by a generally horizontal upper skin 24 which may be provided on the pylon. The upper skin 24 has in its mid-region a circular, downwardly dished portion 25 having a relatively large central opening through which medially located vertical frame members 18 extend outwardly of the pylon 12 into the well formed by the dished portion 25.

Figure 3:
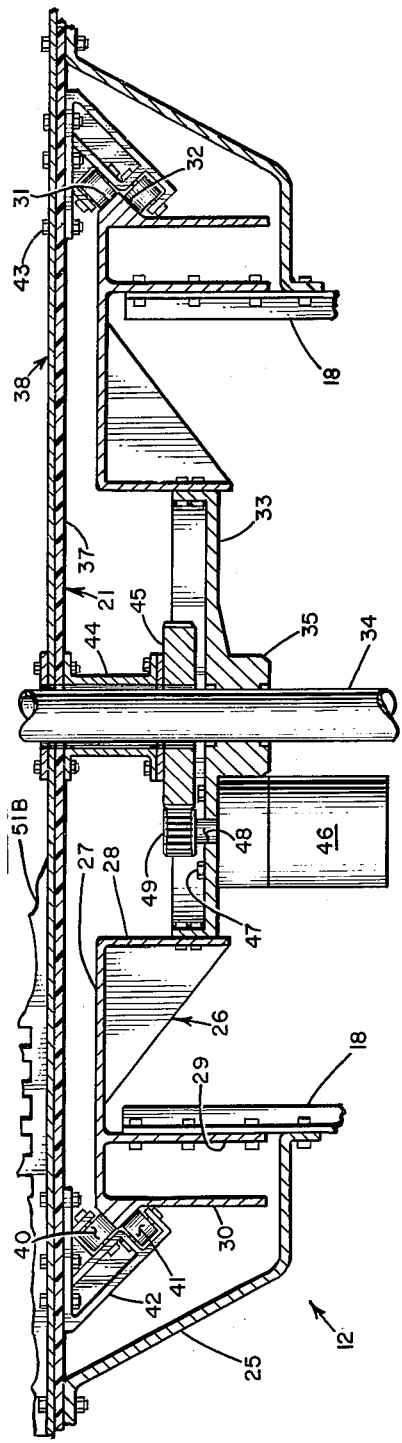
Figure 3 is an enlarged view similar to Figure 2 and showing in greater detail the rotating and mounting means, some of which are shown as cut away for increased clarity of representation.

Referring to Figure 3, the pylon 12 includes a strongly made, supporting member 26 which is rigidly attached to the framework members 18 at the upper end portions of the latter. The supporting member 26, which may be fabricated by any suitable method, for instance, by casting, comprises a circular, horizontally disposed upper plate 27 which is concentrically disposed within the upper skin's dished portion 25 and has a central well defined by a downwardly extending, circular, inner flange 28 which, in the example, is concentric with the vertical centerline of the pylon 12. A similar, downwardly extending second flange 29 provided on the lower surface of the upper plate 27 closely encircles the upper end portions of the framework vertical members 18 and is rigidly attached thereto by any strong, effective means. Spaced outwardly from this flange 29 and concentric therewith, the upper plate 27 may have a downwardly extending annular outer flange 30 which adds strength and rigidity to smooth, circular, upper and lower bearing surfaces or tracks 31, 32 formed on the outer periphery of the plate 27. The circles defined by the tracks 31, 32 may be of the same diameter and are concentric about the pylon centerline. From its inner to its outer edge, the upper track 31 slants downwardly, while the lower track 32 has a corresponding upward slant.

The supporting member further includes a circular lower plate 33 which floors the central well enclosed by the inner flange 28 and is strongly and rigidly attached to or made integrally with the latter. This plate 33 has a central opening large enough to receive a connecting means upper member 34 (to be described) which extends upwardly and rotatably therethrough, along the pylon centerline, into the radome 21. The lower plate 33 may be provided with a hub 35 for axial elongation of the opening in the plate 33 to provide suitable low-friction bearing surfaces for lateral support of the member 34.

If built altogether of metal, the pylon 12 would tend to have a distorting effect on the radiation pattern of the antenna 38. To obviate such distortions, all the pylon parts and fittings, insofar as is practicable and at least in the upper portion of the pylon 12, are preferably constructed of materials which are transparent to the emanations of the antenna.

As shown in Figure 2, the radome 21 has opposed, generally horizontal upper and lower surfaces 36, 37 which could be flat and parallel but which, for best aerodynamic performance, preferably are somewhat dished away from each other. In the edge regions of the radome, this dishing is accomplished in a manner which preferably provides an edge 14 of an aerodynamically desirable contour. In the example, the radome 21 is symmetrical on each side of its chord-plane, that is, the upper portion 36 is in its over-all contour the exact complement of the lower portion 37. The radome 21 should be made of a material which is highly transparent to the radiations of the antenna 38, and may be fabricated according to any effective procedures, such as being generally well known in the art.

In this connection, however, it should be noted that the reinforcement and support contributed by the antenna 38 make possible drastic reductions in the thickness of the walls of the radome 21 as compared to previously radomes housing antennas of capabilities similar to those of the antenna 38. The walls are made as thin as possible (for example, less than four percent of the thickness of the walls of comparable discoid radomes); as a consequence, they contribute importantly to making the radome relatively very light in weight.

To permit its assembly with the antenna 38, the radome 21 may be made in several pieces which are joined together in the assembly process by bonding, the use of fasteners, etc. The radome 21, for example, may be made in upper and lower halves 36, 37 which are brought together with the antenna 38 between them and bonded or otherwise joined together along their juncture 39.

The antenna 38 (Figure 4) is a comb- or rake-like struture comprising a rigid, substantially straight waveguide 50 from end to end of one side of which extend normal thereto a plurality of rigid, parallel, symmetrically spaced prongs 51. This construction is deliberately aimed toward providing a radiating structure which is excellent for electrical purposes and at the same time well adapted for combination, in a relation of mutual reinforcement, bracing, and support, with the radome 21 into the unitary structure 11 of Figure 1. Throughout the electrical description of the features of the antenna-radome structure and the discussion of its operation, the antenna 38 (Figure 4) is for convenience viewed only as a highly superior radiating structure; it should be understood, however, that in its case the Rayleigh-Hemholtz reciprocity theorem, as generalized by Carson to include continuous media, is validly applicable, and that, except for the reversal in the energy-transferring relation, its behaviors as a receiving and as a transmitting antenna are identical. Except to point out that it should be made of materials of good electrical conductivity, further aspects of the electromagnetic characteristics of the antenna 38 will be deferred for later discussion, and features of its general construction will now be described.

Figure 7:
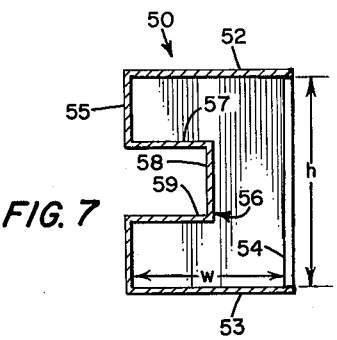
Figure 7 is a cross-sectional view of the waveguide taken at one of its front-wall slots as along line VII—VII of Figure 4.

With reference to Figure 7, the waveguide 50 is of a modified rectangular cross-sectional contour wherein a generally rectangular space is enclosed by parallel upper, lower, front and back walls 52, 53, 54, and 55. The back wall 55 preferably is provided substantially throughout its length with a ridge 56 which extends into the interior of the waveguide 50. The ridge 56 is of rectangular cross-section, has upper, front, and lower sides 57, 58, and 59 which face and preferably are parallel with corresponding walls of the waveguide 50, and may comprise, as in the example, a square-cornered indentation which gives the waveguide's back wall 55 what is commonly termed a hat-sectional form, thus adding considerably to the axial bend-resistance of the waveguide. The waveguide 50 (Figure 4) is placed chordwise of the disc-like radome 21 and as far from the radome's center as its length will permit.

Figure 4:
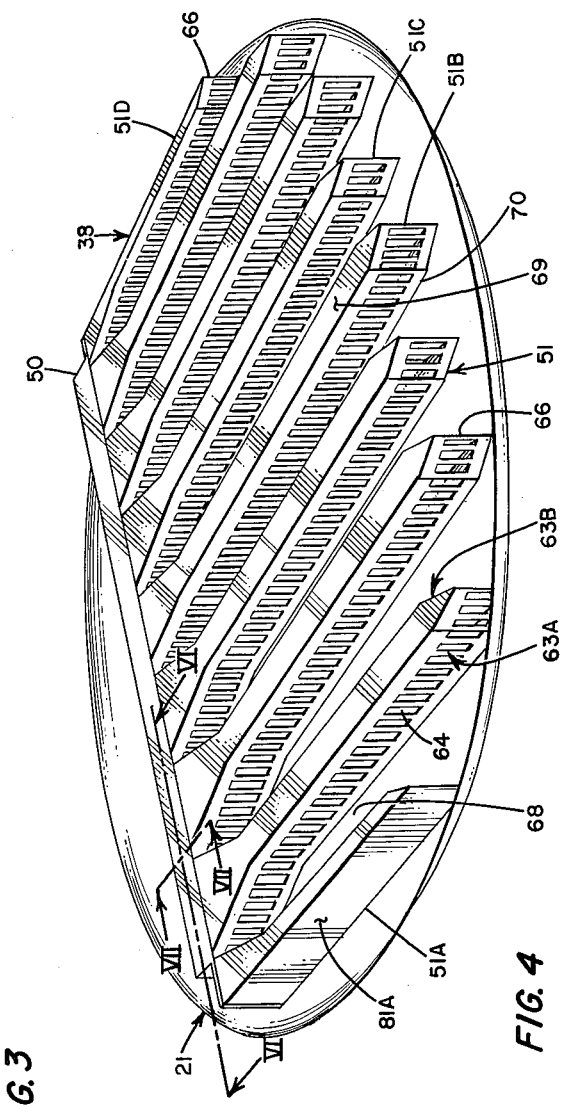
Figure 4 is a perspective view of the radome-antenna, the upper half of the radome not yet having been put into place.
Figure 5:
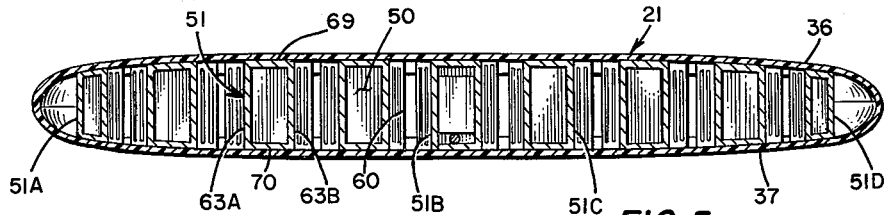
Figure 5 is a vertical cross-sectional view of the radome-antenna structure taken along line V—V of Figure 1.
Figure 6:
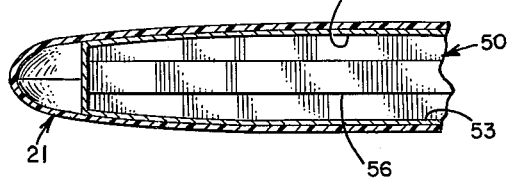
Figure 6 is a longitudinal sectional view of a portion of the radome-antenna structure taken along line VI—VI of Figure 4.

With attention directed now to Figure 5, the front wall of the waveguide 50 is provided with a series of vertically disposed slots 60, one slot 60 between each pair of prongs 51. The functions and spacings of the waveguide slots 60 will be fully discussed in later paragraphs. As shown in Figure 6, the upper and lower contours of the waveguide 50 may be made to fit the corresponding inner contours of the radome 21 for fitting flush against the latter. This generaly is desirable, since it obviates the need of fillers or spacers between the radome 21 and waveguide 50; however, it introduces a certain deviation of the waveguide upper and lower walls 52, 53 from a parallel relationship. For best wave propagation in the guide 50, it is important that certain of the electrical values in the guide remain constant. This is readily achieved by varying the dimensions of the back-wall ridge, as will be explained in later paragraphs. One the other hand, the waveguide 50 may be, as in the version shown in Figure 4, of uniform cross-section along its entire length, and the progressively widening gap which then will occur, toward the waveguide's middle, between its upper and lower walls 52, 53 and the radome upper and lower portions 36, 37 can easily be filled by suitable filler strips or spacers. In such a case, the back-wall ridge 56 (Figure 6) should be substantially invariant in cross-section along its entire length.

The mode of construction of the antenna prongs 51 will now be described. As seen in Figure 4, all the prongs 51, with the exception of the two end prongs 51A, 51D, are substantially identical except for certain minor differences, such as in length. For the most efficient electrical operation and structural combination of the antenna 38 with the circular radome, the center prong 51B, which lies along a diameter of the radome 21, tends to be the longest, while successive flanking prongs become progressively and symmetrically shorter, the two outer prongs 51A, 51D being the shortest. This construction may be followed with excellent results; however, the central prong 51B may optionally be shortened slightly, as shown in Figure 2 and without significant change in antenna efficiency, to facilitate the installation of the reflector 61 and horn 62 of a second radiating device in the radome 21, if this is desired.

With reference to Figures 4 and 5, each prong 51 is rigidly attached by brazing, welding, or other suitable means to the waveguide 50. With exception of the two end prongs 51A, 51D, each has two sidewalls or retarding surfaces 63A, 63B. Except for allowable variations in their length, all the retarding surfaces 63A, 63B are substantially identical. For instance, at the prong 51B (Figure 9), the left-hand retarding surface 63A extends substantially from the waveguide front wall 54 to the prong tip. At the waveguide 50, the surface 63A lies in a plane that extends flush with the nearer edge of the adjoining waveguide slot 60. From the waveguide 50, the left-hand retarding surface 63A, as shown in Figure 4, extends rectilinearly toward the centerline of the prong 51B at an angle and through a certain distance which, like other dimensions and proportions of the antenna 38, depend in part on electromagnetic considerations which will be explained in later paragraphs. The left-hand retarding surface 63A then extends outwardly, in parallel relation to the centerline of the prong 51B, to a point near the prong's outer end, from which point it proceeds in a direction bringing it into intersection with the centerline of the prong 51B at a small acute angle. The right-hand retarding surface 63B, except for minor differences enumerated later, is the opposite-handed counterpart of the left-hand retarding surface 63A and with the latter establishes the general plan-view shape of the prong 51B. This shape is borne out by the upper wall 69 and a substantially identical lower wall, both of which, in the version shown in Figure 4, are substantially flat and are disposed generally normal to the retarding surfaces 63C, 63B. The upper wall 69 is large enough to connect the upper edges of the left- and right-hand retarding surfaces 63A, 63B. The corresponding lower wall similarly extends between the lower edges of the retarding surfaces 63A, 63B and thus completes a hollow body shaped as descirbed and rigidly attached at its base to the front wall of the waveguide 50. The retarding surfaces 63A, 63b are provided with slots 64 which, while having extremely important electrical functions (to be described) at the same time serve as lightening holes which considerably reduce the weight of the prong 51C without reducing below a necessary value the strength it must possess as an integral structural member of the radome-antenna structure. Each prong 51 is thus seen to be a structure reminiscent of an I-beam and exhibiting corresponding strength and rigidity in proportion to weight. This, with other features herein noted, results in an antenna 38 which is strong and rigid in construction and whose parts are well suited to serve as reinforcing and supporting members within the radome 21.

The number of prongs 51 employed on the antenna 38 will depend in large part on the required radiation characteristics, and may vary accordingly. While the antenna shown has nine prongs 51, the antenna 38, with entirely satisfactory results, may be constructed with either a smaller or a larger number of prongs 51. The hollow interior of the central prong 51B houses a feed 65 (Figure 2) and the upper segment 34 of the connecting means (to be described). The right-hand end prong 51D (Figure 9) is, except in length, identical with the prong 51B described except that it is in effect divided down its centerline, the right-hand half removed, and its open right-hand side closed by a flat, solid outer wall extending from the waveguide 50 to the prong tip 66. The left-hand end prong 51A (Figure 4) is the opposite-handed duplicate of the right-hand end prong 51D just described.

Figure 9:
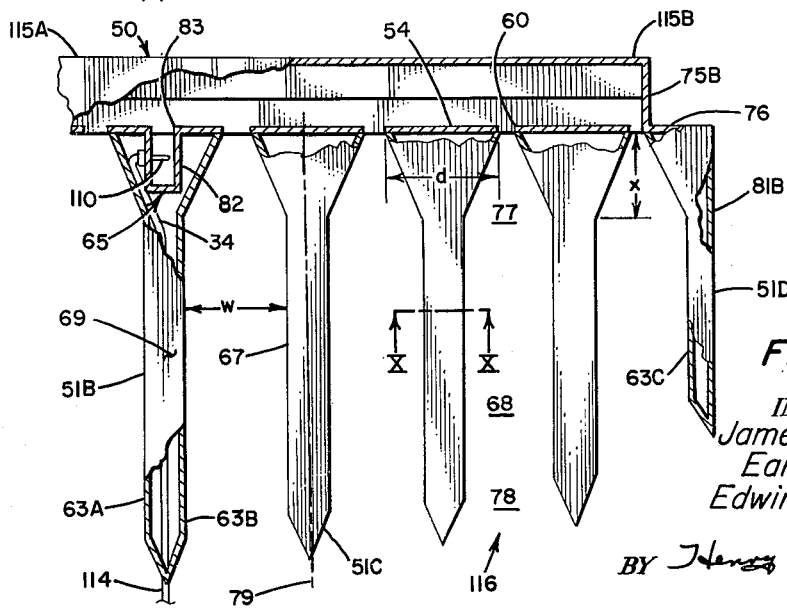
Figure 9 is a fragmentary plan view of the antenna wherein some of the waveguide and prong walls are cut away to show the waveguide slots and the retarding surfaces.

With reference to Figure 9, it will be understood that contained between each pair of prongs 51 there is a bay or horn 116 bounded on its left and right sides by a respective pair of the retarding surfaces 63A, 63B, electromagnetically open at its upper and lower sides and at its outer end to free space, and terminating at its inner end at the waveguide 50. Each horn 116 thus extends generally normal to the waveguide 50 and has a flare which, beginning at the waveguide, is interrupted along a considerable portion of the horn length by a "straight" section 68 in which the side walls are parallel, the flare being resumed at the end of the straight section.

As in the case of the waveguide 50, several modes of construction may be adopted, as found best suited for a particular application, for obtaining the best fit of the prongs 51 in the radome. Thus, as in Figure 4, the upper walls 69 of all the prongs may lie flat in one horizontal plane, and the lower walls 70 may similarly lie in a parallel lower plane, each prong being of one vertical thickness throughout. The same may apply to the upper and lower surfaces, as explained, of the waveguide 50. In such a case, spacers, etc. may be used where needed for effecting solid, rigid attachment of the prongs 51 to the radome 21. Alternatively, the upper and lower walls 69, 70 of the prongs 51 may be contoured, as shown in Figures 2 and 5, to give the antenna 38 an overall shape in which the prong upper and lower walls 69, 70 closely fit the dished internal contours of the radome 21 without the need for spacers, filler strips, etc.

As will be seen, the antenna is rotatably supported through the pylon by the aircraft, and in turn supports and reinforces the thin-walled radome. The radome upper and lower halves consequently must be firmly and thoroughly attached to the antenna upper and lower surfaces, and this may be done by any suitable and efficient means. Such means may include the use of fasteners 71 (Figure 2) piercing and clamping together the prong and radome upper walls 69, 36, the lower walls 70, 37 of the same, the waveguide upper wall 52 and radome upper wall 36, and the lower walls 53, 37 of the waveguide and radome. All these fasteners 71, insofar as it may be of aerodynamic and electrical importance in a particular application, should be of a flush-headed type on their outer and/or inner ends.

A typical means by which the radome-antenna structure 11 may be rotatably mounted on the pylon comprises the two tracks 31, 32 (Figure 3) and upper and lower sets of rollers 40, 41 mounted on the lower surface of the structure 11 by suitable brackets which may be made as shown at 42. Each bracket 42 is rigidly fastened to the antenna 38 by fasteners 43 which pass through the radome lower wall 37 and clamp the latter between the bracket and antenna. The bracket 42 rotatably mounts an upper roller 40 oriented generally outwardly from, above, and in contact with the upper track 31 for rolling on the same, and further mounts a lower roller which is oriented outwardly from and below and which rolls on the lower track 32. A plurality (that is, preferably three or more) of the brackets 42 with rollers 40, 41 are similarly mounted on the radome-antenna structure 11.

Means may be provided for rotating the radome-antenna structure 11 in any way which is compatible with its intended function. As an example, the rotating means may include a vertically disposed torque sleeve 44 concentrically encasing the connecting means upper segment 34 (Figure 3) and bolted at its flanged upper end to the radome lower half 37, the flanged lower end of the sleeve 44 being rigidly attached to and serving to concentrically support a main gear wheel 45 whose main faces are normal to the sleeve. A motor 46, which may be of an electrical or any other suitable type, may conveniently be mounted on the lower side of the supporting member's lower plate 33 by bolts 47 or other fastening means. A shaft 48 of the motor 46 extends upwardly through the plate 33 and bears a gear wheel 49 which meshes with the main gear 45. Thus, rotation of the motor 46 drives the radome-antenna structure through the smaller gear 49, main gear 45, and sleeve 44. The two gears 45, 49 and internal gearing of the motor assembly 46 should be chosen so that the radome-antenna structure 11 is rotated at a controlled, predetermined rate of speed well suited to the particular operation in connection with which the antenna may be utilized. Suitable means for controlled connection of the motor 46 with a source of power must of course be provided; since such are well known and readily obtainable, they will not be shown or further described herein.

The connecting means (Figure 2) serves to conduct radiant energies between the antenna 38 and receiving and transmitting equipment with which it may be employed, and also may be utilized to connect interrogation radar beacon equipment with he small parabolic reflector 61 and horn feed 62 which may optionally be mounted in the radome 21. The connecting means preferably comprises, rotatable, coaxial conductor segment 34 and a lower, fixed, coaxial conductor segment 72 leading to the equipment used with the antenna 38. If it is to serve the interrogation radar as well as the search radar, the upper segment 34 should be of a dual coaxial type. The two segments 34, 72 must be joined by means which permit their relative rotation, and such means may, for instance, comprise a rotary coupling 73 of any suitable type, such being commercially available. Where required for the interrogation radar, the transmitter of the same may be connected through a fixed conductor 113 and the rotary coupling 73 to the upper segment 34. Extending upwardly through the radome 21, the upper conductor segment 34 passes through the hub 35 of the supporting member plate 33 (Figure 3) within which it is rotatable, and through the sleeve 44 into the radome interior. The routing of the segment 34 within the radome 21 may vary, but it conveniently may pass vertically into the central prong 51B (Figure 2) within which it may bend to a horizontal direction leading toward the waveguide 50 within which it terminates upon its juncture with a feed junction 65.

The feed junction 65 (Figure 9) may be any device, a number of such being well known, which will efficiently implement the transition of energy from the connecting means upper segment 34 into the waveguide 50 in a manner exciting a $TE_{01}$ mode of wave propagation in the latter. The feed junction 65 comprises a short, rectangular waveguide section 82 closed at one end and open at the other, the open end being rigidly mounted on the outer face of the front wall 54 of the waveguide 50, and communicates with the latter through an appropriate opening 83 in the waveguide front wall 54. Connection of the connecting means segment 34 to the short waveguide section 82 is through any suitable matching device 110 having a stub or probe projecting into the feed 65 and capable of effecting the transition of energy oscillating in the coaxial mode in the upper segment 34 into the waveguide section 82 of the feed in the form of waves propagated in the $TE_{01}$ mode.

Where the interrogation radar search beacon reflector 61 (Figure 2) and horn 62 are installed in the radome along with the search radar antenna 38, a quarter-wave stub 112 (Figure 2) is provided on the upper segment 34 at the point where it turns from a vertical to a horizontal direction. The stub 112 is in register with the horizontal portion of the segment 34, extends directly away from the waveguide 50, and is shorted at its free end to yield the effect (to oscillations at the search radar's operating frequency) of an open circuit in the direction away from the waveguide 50 at the location where the upper segment 34 changes direction. Such shorting will be found to have no deleterious effect on transmission through the segment 34 to the search radar feed 65. The coaxial conductor 114 of the interrogation radar proceeds through the shorted end of the quarter-wave stub 112 to the corresponding horn 62.

Various advantages attend the described installation of the interrogation radar reflector 61 and horn 62 in the radome 21. Thus, a convenient mounting-place is found, and the interrogation can be carried on simultaneously with detection. Because of the vertical polarization of the interrogation radar waves, the mode of construction of the interrogation radar reflector 61, the elements of the latter being generally vertical, and also because of the wide difference in operating frequencies of the search and interrogation radars, the reflector 61 is virtually transparent to the radiations of the search radar antenna 38.

Figure 10:
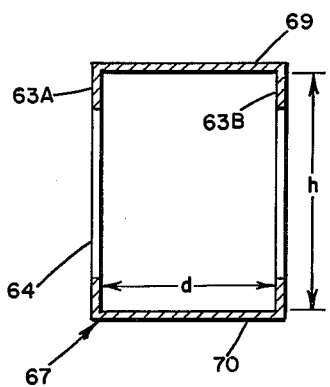
Figure 10 is a typical cross-sectional view of one of the prongs taken as along the line X—X of Figure 8.

In determining the vertical height or thickness of the antenna 38, the height of the interior cavities of the waveguide 50 and prongs 51 must be sufficient to allow the free, fundamental-mode propagation therein of transverse electrical waves at the lower limit of the intended range of operating frequency of the antenna. The heights $h$ of the prongs 51 (as shown in Figure 10) and of the waveguide 50 (Figure 7) are accordingly set at (or, where desired, somewhat above) this value.

For best performance, it is to be desired that the waveguide slots 60 be spaced relatively closely in order that a considerable number of them may be provided in the available length of the waveguide 50, the latter dimension being determined by electrical considerations (to be explained) viewed together with the desirabilities of making the waveguide as short and light as possible. Having set the height $h$ (Figure 7) of the waveguide 50 as specified above, it will be found, however, that the phase velocity of waves within the guide is too high to permit the desired spacing of slots 60.

This difficulty is solved by leaving the height $h$ at the value decided upon as stated above and introducing means for slowing the phase-velocity to a desired value. Such a means, according to the invention, is found in the preferably rectangular ridge 56, whose introduction along substantially the entire length of the back wall 55 is accompanied by a decrease in phase velocity related to the size of the ridge. As a related factor, however, the internal width $w$ of the upper and lower walls 52, 53 controls the characteristic impedance of the waveguide 50, and should be chosen to yield a proper value in this regard. The ridge 56, upon its introduction, tends in effect to narrow the width $w$ and thus affects not only phase velocity but also the characteristic impedance of the waveguide 50. A balance between the dimensions of the ridge 56 and the width $w$ of the upper and lower walls 52, 53 must accordingly be found at which the waveguide 50 is endowed with a proper characteristic impedance and at the same time has a phase velocity which permits the desired spacing of the slots 60. The dimensions of the ridge 56 required for obtaining a desired predetermined value of guide wavelength or phase velocity can readily be determined from the equations and plotted design data curves found in the article "Properties of Ridged Wave Guides" printed in the publication Proceedings of the IRE, volume 35, August 1947, page 783 (Institute of Radio Engineering, 1 East 79 Street, New York, N.Y.).

As will be apparent from the information in the quoted article, introduction of the ridge 56 on the back wall 55 of the waveguide 50 will produce another highly desirable result: the cut-off frequency of the waveguide will be lowered by a significant amount. This, then, makes possible (where structural considerations permit) further minimization of the already comparatively small vertical height $h$ of the waveguide 50. The only limiting factor in regard to which careful attention should be given is that the ridge 56 tends to reduce the power-handling capabilities of the waveguide 50 in a manner positively related to ridge size. Hence, care should be exercised to avoid possible reduction of the waveguide's capabilities in this respect below the power requirements of the system.

The above considerations of dimensions of the waveguide 50 refer, as noted, to its internal dimensions; hence, when proper internal dimensions are maintained, the waveguide may be made of material as thick or as thin as may be desired in view of considerations of structural strength and of weight. It may presently be noted that the above observation is also true in respect to the internal dimensions and materials of construction of the previously mentioned prongs 51. Thus, both the antenna and radome may be made of the thinnest materials which will yield the required strength. Because of the box-like construction of the antenna parts, relatively light-gage material may be used. Combined with its lightness, small size, and the superior fineness ratio made possible by the thinness of the antenna, the radome-antenna structure has much less adverse effect on the performance and endurance of the aircraft by which it is carried than do comparable radome-housed antennas, and consequently can be carried on a much smaller aircraft.

Figure 8:
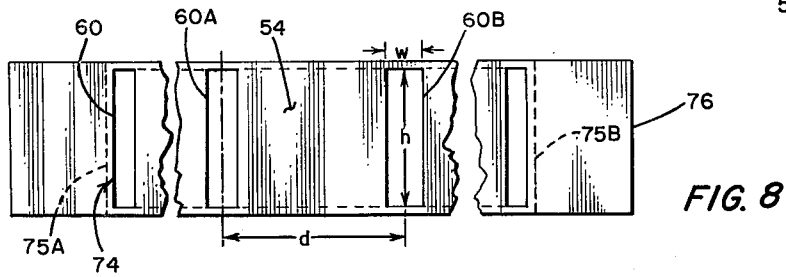
Figure 8 is a fragmentary, front-elevational view of the waveguide before assembly with the prongs.

Attention will now be turned to Figure 8 for discussion of the spacing, size, etc., of the slots 60 provided in the waveguide front wall 54.

The waveguide slots 60 constitute a broadside array 74. Since the relative phase at which energy is supplied to the slots 60 is determined by the interval $d$ between the vertical centerlines thereof, the slots 60 must be spaced apart by multiples of one-half wavelength of the energy supplied thereto by the guide, and it has been found preferable to maintain the interval $d$ at one wavelength.

The length of the broadside array 74 has a pronounced effect on azimuthal beamwidth, and hence should be increased to a value at which a desirably narrow beamwidth is obtained. The increase in length of the array 74 and thus in the number of slots 60 tends to give better distribution of energy along the array and results in radiation of a greater percentage of the emitted energy via the main lobe of the antenna's radiation pattern with accompanying reduction of side-lobe level. The relation of azimuthal beamwidth to the length of the array may be approximated by the expression $$\theta = \frac{k}{a\lambda}$$

where $\theta$ is the included angle between half-power points of the beam, $k$ is a constant determined by the energy distribution to the broadside array 74, $a$ is the length of the array, and $\lambda$ is one free-space wavelength of the emanated energy.

The energy distribution along the array 74 depends upon the relative impedance values displayed by successive slots 60 along the array 74. The impedance of each slot 60 is a function of the slot's horizontal width $w$. Hence, the two central slots 60A, 60B are the widest of the array, and successive slots 60 on each side thereof are preferably varied in width in a manner which implements the desired energy distribution. For instance, where a relatively narrow main-lobe beamwidth with relatively low side-lobe level is desired, the energy level should ordinarily be highest at the center of the broadside array 74 and should progressively lessen toward the array's ends.

While a narrow beamwidth in azimuth is in many cases desirable, side-lobe level, for a given aperture, tends to increase as beamwidth decreases, thus reducing the energy input into the main lobe, with resultant decrease in efficiency of operation. The side-lobe level is determined by the distribution of energy emanated through the slots 60, along the broadside array 74; hence, it is evident that an increase in the number of slots in the array will result in a more uniform energy distribution. The slots 60, as explained, are spaced at an interval of one wavelength in the guide, and hence the factor controlling their spacing is the waveguide phase velocity, previously discussed. Enough slots should be provided to yield a desired side-lobe level in concurrence with the desired beamwidth.

Since the impedances of the slots 60 are in series, the implementation of maximum power transfer from the waveguide 50 through the slots demands that the sum of all the individual slot impedances must be equal to the characteristic impedance of the waveguide.

The height of each slot 60 determines its resonant frequency in that it determines the frequency-wise point at which the slot impedance becomes resistive. For maximum power transfer through each slot 60, it is desirable that its height $h$ should be such that its resonant frequency matches the intended operating frequency of the antenna.

As to the length of the waveguide 50, this is determined by the relative locations of its end walls 75A, 75B (Figure 8). For most thorough miniaturization of the antenna, the end walls 75A, 75B should be flush with the outer borders of the terminal slots 60. Meanwhile, the front wall 54 may be laterally extended beyond the ends of the actual waveguide 50 to provide extensions on which may be mounted the end prongs 51A, 51B (Figure 4).

It will be noted that the antenna as a whole comprises two symmetrical halves lying to either side of the centerline of the central prong 51B. The left-hand and right-hand halves of the waveguide are designated 115A and 115B (Figure 9).

The preceding description of the waveguide 50, when taken as applicable to the flat version of the antenna 38 shown in Figure 4, supplies the information required for determining the waveguide dimensions required for establishing a chosen radiation pattern producible by the broadside array 74 (Figure 7) is acting independently of the balance of the antenna. In the version of the antenna 38 shown in Figures 5 and 6, however, the upper and lower walls 52, 53 of the waveguide 50 are shaped for close fit with the inner contours of the radome 21, and this, of course, is conducive to electrical values which are inclined to vary along the waveguide in a fashion which would produce undesired changes in the radiation characteristics. Thus, for example, variation in the interval $h$ between the upper and lower walls 52, 53 (Figure 7) tends to change the phase velocity along the waveguide 50. The phase velocity may, however, be made constant along the waveguide 50 by appropriate adjustment, along its length, of the dimensions of the back-wall ridge 56.

Horizontally polarized energy radiates from the vertically disposed slots 60 of the waveguide 50 into the bays or horns 116 (Figure 9). Since discontinuities between the slot 60 and the walls of the horns 116, or a flare-angle of the horn which would have the effect of a discontinuity, would result in the diversion of a portion of the emanated energies into reflected waves, with consequent virtual loss of the reflected portions, the opposing walls of the first flared section 77 of each horn 116 should lie in planes which, at the waveguide 50, are flush with the corresponding lateral borders of the respective waveguide slot 60 feeding that horn, and the flare angle should be small enough to yield a reasonably uniform field across the horn at the outer end of the first (inner) flared section 77. For the same reason, the flare angle at the second (outer) flared section 78 should not be excessively large, but should facilitate smooth transition of energy from the horn into space. As long as these limitations are not exceeded, the flare angles at each end of the horns 116 are not especially critical and may be varied as may be expedient for convenience of construction of the antenna 38, for best adapting the antenna to serve as a supporting and reinforcing member of the radome-antenna structure, and for regulating the widths of the horns 116. Variations in flare angle may be more pronounced at the outer flared portions 78 because of the lower concentration of energy at the tips of the prongs 51, most of the energy received by a given horn 116 having been radiated into space before the prong tip is reached.

As noted above, the distance between the centerlines of successive waveguide slots 60 preferably is one wavelength in the guide 50. It was mentioned that the slots 60, however, are progressively narrower toward the ends of the waveguide 50. As a consequence, the interval $d$ (Figure 9) between adjoining borders of successive slots 60 increases toward the waveguide ends. As each retarding surface 63A or 63B, at its base end, is flush with a border of a slot 60, the upper wall 69 of each prong 51, where it contacts the waveguide 50, is of a width identical with the distance $d$ between the borders of the adjacent, flanking slots 60, and the matching lower wall of course is of the same width. With this construction, it will be found that, at its base end, the central prong 51B will be the narrowest, and that the base-end width of successive prongs 51 must become progressively wider toward the ends of the waveguide 50. In its portion in which its two retarding surfaces 63A, 63B are parallel, herein termed its "straight" section 67, each of the prongs 51, in the example shown, may conveniently be of the same lateral width as the other prongs 51, exception being made in the cases of the two end prongs 51A, 51D. This may be varied as desired as long as certain electrical limits, to be specified, are not exceeded. The "straight" section 67 also is shown as beginning in every prong 51 at a same distance $x$ from the waveguide 50. In this regard also, reasonable variations will have little significant effect on antenna performance and may be accomplished for structural and other reasons. Where such variations are made, it is to be preferred that the symmetry of form and balance of the antenna should be preserved.

The centerlines of the prongs 51, as established by their straight sections 67, preferably should all be normal to the waveguide 50, and their lateral spacing may conveniently be established by locating each prong 51 so that its centerline 79 bisects the interval $d$ separating the waveguide slots 60 associated with that prong. With the inner ends of the straight sections 67 of the prongs 51 located at a chosen distance from the waveguide 50, the retarding surfaces 63A, 63B and upper and lower walls 69, 70 of each prong are then fashioned in planes which lie in register with the borders of corresponding slots 60 at the waveguide and lead rectilinearly therefrom in respective directions which bring them into proper, in-register junction with the prong's straight section 67. It will be noted that the above procedure results in establishing the flare angles of the inner flared sections 77. The lengths of the prongs 51 are discussed later in connection with further explanation of the retarding surfaces 63A, 63B.

With reference now to Figures 9 and 10, the left- and right-hand retarding surfaces 63A, 63B preferably are vertical, parallel with each other, and normal to the upper and lower walls 69, 70 of the prong 51. Within the "straight" section 67 of a prong 51, the interval $d$ (Figure 10) between the retarding surfaces 63A, 63B, when held within certain not-likely-to-be-exceeded limits, is by no means critical and consequently may be set at any value resulting in best balance between weight and strength of the antenna 50. This interval $d$ should not be so minute as to prevent wave propagation within the prong 51, nor so large as to excessively narrow the horns 62 lying between successive prongs 51 and bounded by the retarding surfaces 63A, 63B thereof. It will also be recognized that the interval $d$ between the retarding surfaces 63A, 63B affects the impedance of the cavity formed by the prong walls 63A, 63B, 69, 70, and consequently must be large enough to endow the prong 51 with a power-handling capability which is commensurate with the remainder of the radiating system.

As previously explained, the height of each prong 51, that is, the interval $h$ between its upper and lower walls 69, 70, will tend to approximate that of the waveguide 50 to which it is joined. The height of the prong 51 may vary somewhat as may best suit the purposes of miniaturization and structural strength without affecting electrical operation; however, the cavity enclosed within the prong 51 must have a vertical dimension $h$ sufficiently large to support free propagation therein of waves in the $TE_{01}$ mode and should be small enough to suppress higher modes.

In the specific example shown, the slots 64 (Figure 11) piercing one of the retarding surfaces 63A are also typical of the corresponding slots of the other retarding surfaces 63B, and are shown to be uniformly dimensioned and spaced. This is convenient for ease of construction of the antenna and for maintaining uniformity of its physical strength. Dimensions and spacings of the slots 64 are further governed by electrical considerations which will now be discussed.

Figure 11:
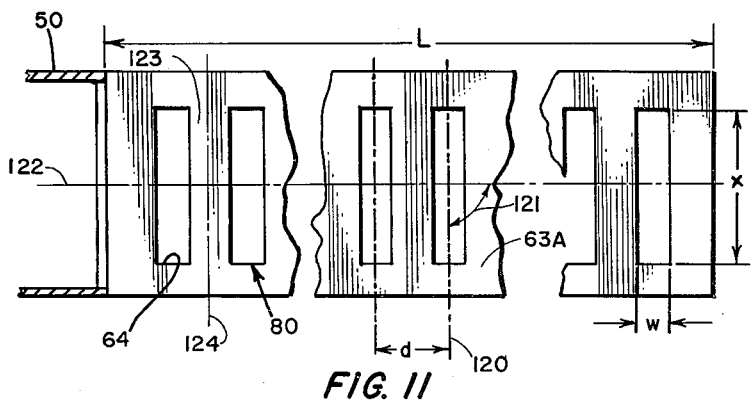
Figure 11 is a fragmentary side-elevational view of one of the prongs.

The spacing $d$ between the centerlines, i.e., the major axes, of the retarding surface slots 64 may be any value which is consistent with good operation of the slots in the manner of an endfire array, and preferably is less than $$\frac{\lambda}{4}$$

of waves inside the prong at the average wavelength experienced within the intended frequency range of the antenna. Otherwise stated, the slot spacing $d$ must be adjusted in such manner that radiation emitted by the waveguide 50 and incident on the retarding surface will be reradiated by the slots 64 in such manner that reradiated energies from successive slots reinforce each other in a direction normal to the waveguide 50. It will be noted that, as shown in the drawing, the slots 64 utilized for the purposes herein described have centerlines (or major axes) 120 and that these extend at an appreciable (and hence, finite) angle 121 to the longitudinal centerline or axis 122 of the retarding surface 63A, the angle shown by way of providing a specific example being preferably one of 90°. It will be understood that use of the above-defined interval $d$ results in a spacing between adjoining slots 64 which definitely is shorter than the length of the slot major axis 120, which length is shown in Figure 11 at $x$.

Since the slots 64 preferably are formed by piercing the conductive strip 63A or otherwise providing in it surface discontinuities of equivalent electrical effect, portions 123 of the conductive strip extend between neighboring slots 64 and reach from the top to the bottom edge or border of the conductive strip 63A. These portions 123, then, form and define the borders of the slots 64, and each has a centerline 124 which, from the bottom to the top edge or border of the strip 63A, extends generally upwardly and, which, where it lies between slots 64, is free from any recurvature, the centerline 124 shown in the preferred example being rectilinear.

The vertical length of the slot 64 along its major axis 120 is the chief factor controlling the phase velocity of propagation along the retarding surface 63A or 63B in that it largely controls the amount of energy reradiated by the slot 64. The slot length $x$ preferably should be less than one-half the average free-space wavelength in the frequency range of the antenna and the resulting phase velocity of energies along the retarding surface 63A or 63B should satisfy the well-known Hansen-Woodyard condition for increased directivity, $$(B_1 - B_0)L = \pi$$

where $B_1$ = surface-wave phase coefficient,
$B_0$ = space-wave phase coefficient, and
$L$ = length of array, which equation may be used to obtain the optimum elevation pattern of the antenna. An example is given of the effect of slot length $x$ on phase velocity along the retarding surface. In the region $$0.5 < \frac{V_p}{C} < 1.0$$

where $V_p$ = phase velocity and $C$ = velocity of light, the phase velocity is given by the empirically derived equation $$V_p = \frac{kC}{x}$$

where $x$ = slot length and $k$ = a constant which is a function of the vertical dimension of the retarding surface 63A or 63B, the spacing $d$ between successive slots 64, and slot width.

From the above, it may be noted that slot width $w$ has some effect (though it has been found to be relatively small) on phase velocity along the retarding surface 63A or 63B. The slot width $w$ of course must be such as to obviate arc-over across the slot 64.

The length L of the endfire array 80 formed by each series of slots 64 (consequently, the length of the prong 51), may be determined by considerations of the dimensions available in a particular application and by the required elevational beamwidth. As these considerations tend to be mutually contradictory, the result must in some cases be a compromise between them. It has been found, however, that the space available in a disc-like radome of a diametric size sufficient to house the waveguide-fed broadside array 74 (Figure 7) is ample for prong lengths L (Figure 11) giving gratifyingly narrow beamwidth in elevation. The half-power beamwidth of the endfire array 80 is given by the equation $$\theta_{hp} = \frac{k}{\sqrt{L_\lambda}}$$

where $\theta$ = included angle of half-power beamwidth,
$L_\lambda$ = array length expressed in free-space wavelengths, and
$k$ = a constant (approximately 60) for endfire arrays.

In a non-housed application of the antenna 38 (Figure 4), some advantages would accrue to constructing all the prongs 51 to the same length L. However, the contour of the disc-like radome 21 dictates that the prongs 51 grow successively shorter from the centerline to the lateral ends of the antenna. Experimentation, accomplished in reduction of the antenna 38 to practice, has shown that such symmetrical variation in length produces little or no loss in performance which is perceptible in the very sensitive, high-quality equipment with which it is best used. Thus, for most economical housing of the antenna 38 in the disc-like radome 21, the lengths L of the prongs 51 can be varied without significant penalty.

A few words remain to be said concerning the outer lateral wall 81B of the right-hand end prong 51D (Figure 9). Since the end prong 51D, for its inner lateral wall, has a reradiating retarding surface 63C similar to those 63A, 63B of the other prongs 51, the outer wall 81B must be complete and without openings in order that energy will not be lost therethrough into space. For identical reasons, a solid outer wall 81A (Figure 4) is also provided on the left-hand end prong 51A.

The width of each horn 116 in its medial, non-flared "straight" section 68 (Figure 8) must be sufficient to support wave propagation therein, but otherwise is not thought to be especially critical. As the spacing between contiguous borders of successive slots 60 of the broadside array 74 becomes progressively greater toward the ends of the waveguide 50, and as the presently described example utilizes a constant width of the prongs 51 in their "straight" sections 67, the non-flared sections 68 of successive horns 116 are of progressively greater width $w$ from the centerline to the lateral ends of the antenna 38. The width of each horn 116 in its "straight" section 68 should not be allowed to become so great that an excessive flare angle is required in the inner flared section 77.

The operation of the antenna-radome structure and the means and mechanisms associated therewith will now be described. Radio-frequency (R.-F.) energy, generated by the search radar transmitter installed in the aircraft 10 (Figure 2) and conducted therefrom through the connecting means lower segment 72, rotary coupling 73, and upper segment 34 to the waveguide feed junction 65, is transformed at the latter from the coaxial to the $TE_{01}$ mode. At the junction of the feed 65 and waveguide 50, the R.-F. energy is divided into two parts for equal apportionment thereof to te left- and right-hand sections 115A, 115B (Figure 9) of the waveguide, and is propagated through the latter to the waveguide's front-wall slots 60. The power radiated by each slot 60 is a function of the impedances of the slots 60 as determined by the required energy-distribution of the antenna 38.

Each waveguide slot 60 radiates into the throat of a respective one of the horns 116 lying between a respective pair of the antenna prongs 51, and the radiated energy is propagated axially along the horn. By virtue of the specific construction of the retarding surfaces 63A, 63B of the prongs 51, a portion of the energy propagated along the horn 116 enters the interiors of the adjacent prongs 51 and is reradiated therefrom by the retarding surfaces 63A, 63B into the horn 116, and this causes a decrease in phase velocity of waves along the retarding surfaces. As a consequence of this phase retardation, the energy radiated into space from the horns 116 exhibits a narrowed elevational beamwidth. The radiation pattern of the antenna 38 in azimuth is the vector addition of the individual azimuthal radiation patterns of the several horns 116, while in elevation, the antenna's radiation pattern is virtually identical with that of any one of the horns. Otherwise stated, the radiation pattern of the antenna 38 may be considered as the product of the pattern of one horn 116 multiplied by the pattern of the broadside array (the array of waveguide slots 60) without the horns present.

Rotation in azimuth of the beam transmitted by the antenna 38 (and the beam of the interrogation radar horn 62 and reflector 61, if these latter items are installed) permits the search radar (and interrogation radar) to look successively in all directions around the horizon. This rotation is accomplished by the motor 46, gears 45, 49, and torque sleeve 44 as previously described, which together rotate the antenna 38, consequently the radome 21 and interrogation radar horn 62 and reflector 61. While freely allowing rotation of the radome-antenna structure 11, the supporting means tracks 31, 32 and bracket-mounted rollers 40, 41 clearly prohibit vertical and horizontal motions of the radome-antenna relative to the pylon 12. Because of its small vertical dimension, the radome-antenna imposes greatly reduced flight penalties on the aircraft by which it is carried. Since the radome-antenna does not extend quite as far above the aircraft as do the vertical tail surfaces 15, the aircraft is readily accommodated by existing hangar decks of aircraft carriers; and the radiation center of the antenna is adequately high above the aircraft to prevent serious distortion of its radiation pattern.

As previously explained, energy existing in the coaxial mode in the connecting means upper segment 34 (Figure 9) experiences a transition at the matching device 110 into the feed 65, and waves in the $TE_{01}$ mode are propagated along the short waveguide section 82 of the latter into the waveguide proper 50. Because of their spacing, the slots 60 in the front wall of the waveguide 50 are excited in phase by the $TE_{01}$ waves in the guide, and consequently, if the antenna prongs 51 were not present, would behave as a broadside array whose radiation pattern would be determined by the vertical and horizontal dimensions, discussed in earlier paragraphs, of the waveguide 50 and slots 60.

In such a case, energy would be radiated in phase from the slots 60 to yield a radiation pattern which would be expected to have a very broad beamwidth in elevation and an azimuthal beamwidth characterized by the empirically derived relation $$\theta_{hp} = \frac{k}{L_\lambda}$$

In an application, for example, where a narrow azimuthal beamwidth is desired, the specified spacing of the waveguide slots 60 at one wavelength (in the guide) will result in the slots being separated by more than one wavelength (in space). Thus, the prongs 51 being absent, the pattern will display sidelobes on the order of the main lobe, and although the desired narrowness of the main lobe will be attained, it will be accompanied by the disadvantages of great elevational beamwidth and prohibitively high side-lobe level. Further, there will be the disadvantages of high mutual coupling between the slots 60, which further aggravates the problems of arriving at a prescribed phase and amplitude distribution across the aperture. Such a radiation pattern is not obtained from the antenna of the invention, however, and this is by virtue of the horn-defining prongs 51 and their retarding surfaces (generally numbered 63).

It has previously been proposed that a broadside array of slots giving a desirably narrow azimuthal beamwidth be provided with an array of horns, each fed by an individual slot and each having upper and lower walls flared at an angle calculated to result in a desired narrowness in elevation of the beam radiated from the horn arrays. Some such constructions have had patents issued on their several elements of novelty, and in certain usages are entirely suitable and effective. Because of the relatively great vertical dimensions imposed on the antenna by the necessary flare of the upper and lower walls of the horns, however, such an antenna would not be suitable for use in the thin radome of the radome-antenna structure, and also could not serve nearly so well as is necessary as an integral structural member.

It was conceived by the inventors that relatively thin, open horns (that is, horns without upper and lower walls) could be provided in association with a broadside array of slots, thus forming a vertically thin antenna of a construction lending itself excellently to incorporation, as herein described, into the thin, unitary, radome-antenna structure, if means could be found to cause such an antenna to provide a radiation pattern of suitable vertical beamwidth and side-lobe level. To this end, it was sought to decrease elevational beamwidth, side-lobe level being reduced by vector addition of the individual azimuthal radiation patterns of the several horns, by providing retarding surfaces on the horn walls.

Various constructions expected to be of usefulness as retarding surfaces were considered or actually tried out in this capacity. These constructions feature irregular surfaces which constrain currents to much longer pathlengths, for flowing thereon axially of the horn, than would be encountered if the surfaces were entirely regular. Waves propagated along the horn axis are consequently slowed at and near the horn walls since, in a given time, the current in the horn walls can make less axially measured headway than can the portion of the wave front at and near the horn axis. Due to the finite conductivity of the surfaces, the longer pathlengths also impose added resistances on the currents; consequently, a greater part of the energy impinging upon the surface is dissipated as heat, and this also is associated with the retardation of the wave at and near the surface. Irregular surfaces considered or given experimental use include: ridged surfaces (which were found to be too heavy); dielectric surfaces (also too heavy, and with prohibitive dielectric loss); surfaces drilled or punched with holes (not enough retardation obtained); and honeycomb and mesh-covered surfaces (again, not enough retardation in a surface of reasonable size and weight).

With the intention of reducing the phase velocity along the walls of the horns 116 through more positively and extensively increasing the pathlengths of currents engendered by the impingement of radiated waves on the retarding surfaces 63 (which, it will be noted, would normally be expected to concomitantly increase the resistances offered to such currents, a newly conceived mode of construction of the retarding surface was tried: the surfaces forming the horn walls were provided with slots 60 such as herein described. It was expected that the desired retardation would be accompanied by a considerable power loss, but it was felt that this might be acceptable as an inescapable penalty to be paid for the increased retardation.

Gratifyingly enough, much more than the hoped-for retardation was obtained from the experimental construction of the above character. Further, it was found that the phase velocity along the horn walls could be readily and closely controlled by varying the dimensionings of the slots, as previously explained.

It rapidly became evident, however, that the superior results obtained were not due to the factors relied upon to accomplish the retardation, and further experimentation revealed conclusively that, although the results exceeded what had been hoped for, those factors were not significantly, if at all, operative in the retardation process.

For example, the power-loss (regarded as unavoidable) did not appear, and it became evident that the excellent retardation obtained was due not to increased path-lengths, heat losses, etc., but to entrance of some of the energy radiated from the waveguide slots into the prongs through the slots of the latter and reradiation of this energy, further down the horn axes, into the horns.

As a result, the gain of the radiated signal was much improved, and the maximum obtainable range is significantly increased. The considerable loss in gain which must occur when employing previously utilized highly "lossy" surfaces was avoided, the retarding surface utilized in the present invention being characterized by strikingly low loss, since virtually all energy entering the prongs from the horn at any point is returned again to the horn at a point farther from the waveguide.

Although not all aspects of the orders and relations characterizing the process by which the improved retardation is effected are presently understood by the inventors, the effect of this process on the energies emitted by the broadside array has been thoroughly determined. Fed into the horns 116 from the broadside array slots 60 as described, direct radiation down the horns is accompanied, in each horn, by entrance of some of the energy into the prongs 51 bounding the horn and with subsequent reradiation into the horn. By virtue of interaction between the directly radiated and reradiated energies, the resultant radiation into space is of a form characterized by a sharply defined azimuth pattern which is slightly narrower than would be obtained from the broadside array alone, an extensively reduced elevational beamwidth, and elimination of the large side-lobes, thus introducing their energy into the main lobe.

While only one embodiment of the invention, together with certain modifications thereof, has been shown in the accompanying drawings, it will be evident that various further modifications are possible in the arrangement and construction of the reduced-height radome-antenna without departing from the scope of the invention.

We claim:

1. An apparatus for transmitting and receiving high-frequency electromagnetic energy comprising: an elongated, hollow, two-ended waveguide of rectangular cross-section and closed at both ends, said waveguide having a wall; radiating means spaced along said wall and operative for radiating electromagnetic energy from said waveguide; feed means for propagating high-frequency electromagnetic energy in said guide; and an array of horns made of conductive material and individually fed by respective ones of said radiating means, said horns having substantially vertical lateral sides and being open along substantially the entire lengths of their upper and lower sides, said lateral sides including wave-retarding surfaces characterized by surface discontinuities.

2. An apparatus such as claimed in claim 1, said radiating means comprising slots piercing said front wall of said waveguide.

3. An apparatus such as claimed in claim 1, neighboring walls of adjacent horns intersecting at their outer ends to form at least one prong projecting from said waveguide.

4. In combination with an antenna including a hollow waveguide having a wall and provided with radiating means operable for radiating electromagnetic energy from within said guide to locations outside said wall, a retarding surface comprising a substantially smooth conductive strip having a horizontally disposed longitudinal axis and an end, said end lying contiguous to said radiating means and said strip extending therefrom outwardly of said wall; a face of said strip adjacent said radiating means and extending along said axis, said face being swept by respective ends of waves which have been radiated via said radiating means and being electromagnetically exposed to free space above and below said strip, said strip being pierced by slots provided along the longitudinal axis thereof, said slots being so constructed and arranged that said ends of said waves sweeping said strip are retarded behind other portions of said waves and energy losses sustained by said waves through action of said retarding surface are negligible, each of said slots having a major axis extending at a finite angle to the longitudinal axis of said strip, at least some of said slots each being spaced from another of said slots by an interval shorter than the major axis of said other slot.

5. For an antenna including a hollow waveguide having a wall and provided with radiating means operable for radiating electromagnetic energy from within said guide to locations outside said wall, a hollow prong electromagnetically exposed along at least a substantial portion of its length to free space and having a base lying contiguous to said waveguide wall and radiating means, said prong extending outwardly of said waveguide and comprising: conductive, spaced-apart upper and lower walls; conductive, spaced-apart sidewalls connecting said upper and lower walls, at least one of said sidewalls comprising a retarding surface provided on an exterior surface of said sidewall and swept by respective ends of waves radiated via said radiating means, said retarding surface constituting a substantially smooth strip pierced by slots distributed in the direction of wave propagation therealong, said slots being so dimensioned and arranged that said ends of said waves sweeping said retarding surface are retarded behind other portions of said waves and energy losses sustained by said waves through action of said retarding surface are negligible.

6. An antenna for transmitting and receiving high-frequency electromagnetic energy comprising: a hollow wave-guide of rectangular cross-section and having a wall; radiating means operable for radiating electromagnetic energy from within said waveguide to locations outside said waveguide wall; and a pair of hollow prongs substantially freely exposed electromagnetically to free space and having respective bases lying contiguous to and on opposite sides of said radiating means, said prongs extending in spaced relation outwardly from said wall, each of said prongs comprising spaced-apart, conductive upper and lower walls and spaced-apart, conductive sidewalls connecting said upper and lower walls, at least one of said sidewalls being swept by respective ends of waves emanated from said radiating means and comprising a substantially smooth-faced strip pierced by slots distributed along and extending athwart the longitudinal axis thereof, said slots being so dimensioned and arranged that said ends of said waves sweeping said at least one sidewall are retarded behind other portions of said waves and energy losses sustained by said waves through action of said sidewall are negligible.

7. An apparatus for the transmission and reception of relatively high-frequency electromagnetic energy, said apparatus comprising: a plurality of hollow prongs of generally quadrilateral cross-section, said prongs having respective bases; means for mounting said prongs substantially in side-by-side relation in a common plane, said prongs being spaced apart within said plane to form an array therein and defining, between each two successive prongs, the lateral sides of an elongated bay having upper and lower sides electromagnetically open to free space; feed means for in-phase radiation into said bays, at ends thereof adjacent said prong bases, of high-frequency electromagnetic waves electrically polarized in said plane in which said prongs are spaced, each of said prongs having a first spaced-apart, opposing pair of walls designatable as "upper" and "lower" when said plane in which said prongs are spaced is horizontal and each of said prongs further having second walls of which there are an opposed, spaced-apart pair connecting corresponding edges of said first pair of walls, one of said second walls, in a one of said prongs at each end of said array, being opaque to said waves and being removed from all of said bays, the remainder of said second walls throughout the majority of their respective lengths each being swept by respective ends of said waves and being fashioned of a substantially smooth-faced strip pierced by slots distributed along and lying athwart the respective longitudinal axis of said strip, said slots being so dimensioned and arranged that said ends of said waves sweeping said second walls are retarded behind other portions of said waves and the energy losses sustained by said waves through action of said second walls are negligible.

8. For transmititng and receiving high-frequency electromagnetic waves in a pattern charcterized by relatively high gain, low side-lobe level, and narrowness of beam in azimuth and elevation, an antenna comprising: an elongated, substantially straight, rectangular-pipe waveguide closed at both ends, said waveguide having a front wall and a back wall and being substantially of minimum internal height for free propagation therein of $TE_{01}$ waves within the operating frequency range of said antenna, said waveguide being substantially of minimum length for accommodation of a horizontal array recited below; means provided in said waveguide for reducing the phase velocity of waves therein for permitting relatively close spacing of the radiating means recited below; feed means for propagating high-frequency electromagnetic waves in the $TE_{01}$ mode in said waveguide; a horizontally disposed broadside array comprising radiating means spaced along said waveguide front wall substantially at equal intervals of substantially one wavelength in said waveguide and operative for radiating, from said waveguide, horizontally polarized waves in a pattern tending to be characterized by a main lobe narrow in azimuth and broad in elevation; an array of horizontally disposed hollow prongs of generally rectangular cross-section electromagnetically substantially open from above and below to free space, rigidly mounted on said waveguide, and extending outwardly from said front wall in spaced side-by-side relation, said array of prongs extending substantially throughout the length of said waveguide, the interior vertical height of each of said prongs being substantially the minimum for supporting therein wave propagation in the $TE_{01}$ mode at the antenna operating frequency and the length of said prongs being commensurate with obtaining to a desired degree a retardation identified below; and sidewalls on said prongs defining separate bays interlying successive adjoining prongs, said bays being individually fed by single ones of said radiating means of said broadside array, each of said sidewalls being swept by respective ends of waves directly radiated by said radiating means and being fashioned of a substantially smooth-faced strip pierced by slots distributed along and lying athwart the longitudinal axis thereof, said slots in said strip being so dimensioned and arranged that directly radiated wave-energy sweeping said strip effects the propagation of wave-energy interiorly of the one of said prongs bearing said strip, the reradiation of said wave-energy from said prong into said bay defined thereby, and retardation along said strip of said ends of said waves sweeping said strip; the rate of said retardation along said strip being a function of the lengths of said slots and the total retardation being a function of the length of said strip, said retardation constraining said antenna to radiation in a pattern exhibiting a substantial reduction of the elevational beamwidth of said broadside array.

9. An antenna such as claimed in claim 8, said means provided in said waveguide for reducing the phase velocity of waves therein comprising a ridge provided interiorly of said waveguide on said back wall thereof, said ridge extending substantially the length of said waveguide.

10. An antenna such as claimed in claim 8, said radiating means of said broadside array comprising slots piercing said front wall of said waveguide, the centerlines of said slots being spaced at intervals of one wavelength in said waveguide.

11. An antenna such as claimed in claim 9, said radiating means of said broadside array comprising slots piercing said front wall of said waveguide, the centerlines of said slots being spaced at intervals of one wavelength in said waveguide.

12. A thin, discoid antenna-radome structure comprising: an elongated, substantially straight rectangular-pipe waveguide closed at both ends, said waveguide having a front wall and a back wall and being substantially of minimum internal height for free propagation therein of $TE_{01}$ waves within the operating frequency range of said antenna, said waveguide being substantially of minimum length for accommodation of a horizontal array recited below; means provided in said waveguide for reducing the phase velocity of waves therein for permitting relatively close spacing of a radiating means recited below; feed means for propagating high-frequency electromagnetic waves in the $TE_{01}$ mode in said waveguide; a horizontally disposed broadside array comprising radiating means spaced along said waveguide front wall substantially at equal intervals of substantially one wavelength in said waveguide and operative for radiating, from said waveguide, horizontally polarized waves in a pattern tending to be characterized by large side-lobes and a main lobe narrow in azimuth and broad in elevation; a plurality of horizontally disposed hollow prongs of generally rectangular cross-section rigidly mounted on said waveguide and together with the latter and said phase velocity reducing means, feed means, and broadside array constituting an antenna, said prongs extending outwardly from said front wall in spaced, side-by-side relation in an array extending substantially the length of said waveguide, the interior vertical height of each of said prongs being substantially the minimum for supporting, in said prong, wave propagation in the $TE_{01}$ mode at the antenna operating frequency; sidewalls on said prongs defining separate bays interlying successive adjoining prongs, said bays being individually fed by single ones of said radiating means of said broadside array, each of said sidewalls being swept by respective ends of waves directly radiated by said radiating means and being fashioned of a substantially smooth-faced strip pierced by slots distributed along and lying athwart the longitudinal axis thereof, said slots in said strip being so dimensioned and arranged that directly radiated wave-energy sweeping said strip effects the propagation of wave-energy interiorly of the one of said prongs bearing said strip, the reradiation of said wave-energy from said prong into said bay defined thereby, and retardation along said strip of said ends of said waves sweeping said strip; the rate of said retardation along said strip being a function of the lengths of said slots and the total retardation being a function of the length of said strip, said retardation constraining said antenna to radiation in a pattern exhibiting a substantial reduction of the side-lobe level and elevational beamwidth of said broadside array; and an aerodynamically contoured hollow discoid body enclosing said antenna, said discoid body comprising a thin sheet rigidly fastened to and deriving support and reinforcement from internal structural members identified as said waveguide and prongs of said antenna, said discoid body serving to protect and fair said antenna and in its areas illuminated by said antenna being of a sheet thickness less than the ratio $$\frac{\lambda}{4\sqrt{\epsilon}}$$

where $\lambda$ is a free-space wavelength at the operating frequency of said antenna and $\epsilon$ is the dielectric constant of said thin sheet.

13. For the transmission and reception of high-frequency electromagnetic waves, a facility comprising: an antenna such as claimed in claim 8, said prongs thereof defining an aperture; an elongated reflector disposed longitudinally of said aperture adjacent the outer ends of said prongs, said reflector being substantially constructed of thin vertically disposed conductive elements substantially transparent to radiations of said antenna; and a horn facing said reflector and feeding the latter with vertically polarized electromagnetic waves at a frequency at which mutual interferences with each other of radiations from said antenna and from said horn are negligible.

14. For the transmission and reception of high-frequency electromagnetic waves, a facility comprising: a vertically extending pylon; an elongated, substantially straight, rectangular-pipe waveguide closed at both ends, said waveguide having a front wall and a back wall and being substantially of minimum internal height for free propagation therein of $TE_{01}$ waves, at the operating frequency of said antenna, said waveguide being substantially of minimum length for accommodation of a horizontal array recited below; means provided in said waveguide for reducing the phase velocity of waves therein for permitting relatively close spacing of the radiating means recited below; feed means for propagating high-frequency electromagnetic waves in the $TE_{01}$ mode in said waveguide; a horizontally disposed broadside array comprising radiating means spaced along said waveguide front wall substantially at equal intervals of substantially one wavelength in said waveguide and operative for radiating, from said waveguide, horizontally polarized waves in a pattern tending to be characterized by large side-lobes and a main lobe narrow in azimuth and broad in elevation; a plurality of horizontally disposed hollow prongs of generally rectangular cross-section rigidly mounted on said waveguide and together with the latter and said phase velocity reducing means, feed means, and broadside array constituting an antenna, said prongs extending outwardly from said front wall in spaced, sideby-side relation in an array extending substantially the length of said waveguide, the interior vertical height of each of said prongs being substantially the minimum for supporting, in said prong, wave propagation in the $TE_{01}$ mode at the antenna operating frequency; sidewalls on said prongs defining separate bays interlying successive adjoining prongs, said bays being individually fed by single ones of said radiating means of said broadside array, each of said sidewalls being swept by respective ends of waves directly radiated by said radiating means and being fashioned of a substantially smooth-faced strip pierced by slots distributed along and lying athwart the longitudinal axis thereof, said slots in said strip being so dimensioned and arranged that directly radiated wave-energy sweeping said strip effects the propagation of wave-energy interiorly of the one of said prongs bearing said strip, the reradiation of said wave-energy from said prong into said bay defined thereby, and retardation along said strip of said ends of said waves sweeping said strip; the rate of said retardation along said strip being a function of the lengths of said slots and the total retardation being a function of the length of said strip, said retardation constraining said antenna to radiation in a pattern exhibiting a substantial reduction of the side-lobe level and elevational beamwidth of said broadside array; an aerodynamically contoured hollow discoid body enclosing said antenna, said discoid body comprising a thin sheet rigidly fastened to and deriving support and reinforcement from internal structural members identified as said waveguide and prongs of said antenna, said discoid body serving to protect and fair said antenna and in its areas illuminated by said antenna being of a sheet thickness less than the ratio $$\frac{\lambda}{4\sqrt{\epsilon}}$$

where $\lambda$ is a free-space wavelength at the operating frequency of said antenna and $\epsilon$ is the dielectric constant of said thin sheet; means for rotatably mounting said antenna on said pylon; means for rotating said antenna; and coaxial means including a rotary coupling and connecting said antenna to associated equipment.

15. A facility such as claimed in claim 14, said facility further comprising: an elongated reflector between said discoid body and said prongs of said antenna, said reflector being of a construction substantially transparent to said radiation of said antenna; and a horn feeding said reflector with vertically polarized electromagnetic waves at a frequency at which mutual interferences between radiations of said antenna and said horn are insignificant.

16. An antenna-radome structure comprising: an elongated, hollow, two-ended waveguide of rectangular cross-section and closed at both ends, said waveguide having a wall; radiating means spaced along said wall and operative for radiating electromagnetic energy from said waveguide; feed means for propagating high-frequency electromagnetic energy in said guide; an array of horns made of conductive material and individually fed by respective ones of said radiating means, said horns having substantially vertical lateral sides and being open along substantially the entire length of their upper and lower sides, said lateral sides including wave-retarding surfaces characterized by surface discontinuities; and an aerodynamically contoured hollow body enclosing said waveguide and horns, said body comprising a thin sheet substantially transparent to energies radiated from said waveguide and horns, said body being rigidly fastened to and deriving support and reinforcement from internal structural members identified as said waveguide and horns, said body serving to protect and fair said waveguide and horns and, in its areas illuminated thereby, being of a sheet thickness less than the ratio $$\frac{\lambda}{4\sqrt{\epsilon}}$$

where $\lambda$ is a free-space wavelength at the operating frequency of said waveguide and horns and $\epsilon$ is the dielectric constant of said thin sheet.

17. An antenna-radome structure comprising: a hollow waveguide having a wall and provided with radiating means operable for radiating electromagnetic energy from within said guide to locations outside of said wall; a hollow prong electromagnetically exposed along at least a substantial portion of its length to free space and having a base lying contiguous to said waveguide wall and radiating means, said prong extending outwardly of said waveguide; conductive, spaced-apart upper and lower walls on said prong; conductive, spaced-apart sidewalls connecting said upper and lower walls, at least one of said sidewalls comprising a retarding surface provided on an exterior surface of said sidewall and swept by respective ends of waves radiated from said waveguide via said radiating means, said retarding surface constituting a substantially smooth strip pierced by slots distributed in the direction of wave propagation therealong, said waveguide and prong constituting an antenna; and a hollow body enclosing said antenna, said body constituting a radome and comprising a thin sheet rigidly fastened to and deriving support and reinforcement from internal structural members identified as said waveguide and prong of said antenna, said hollow body serving to protect and fair said antenna and in its areas illuminated by said antenna being of a sheet thickness less than the ratio $$\frac{\lambda}{4\sqrt{\epsilon}}$$

where $\lambda$ is a free-spaced wavelength at the operating frequency of said antenna and $\epsilon$ is the dielectric constant of said thin sheet.

18. In combination with an antenna including a hollow waveguide having a wall and provided with radiating means operable for radiating electromagnetic energy from within said guide to locations outside said wall, a retarding surface comprising: a substantially smooth conductive strip having upper and lower edges, a horizontally disposed longitudinal axis, and an end, said end lying contiguous to said radiating means and said strip extending therefrom outwardly of said wall; a face of said strip adjacent said radiating means and extending along said axis, said face being swept by respective ends of waves which have been radiated via said radiating means and being electromagnetically exposed to free space above and below said strip, said strip being pierced by slots provided along and extending at an angle to the longitudinal axis of said conductive strip, said slots being so constructed and arranged that said ends of said waves sweeping said strip are retarded behind other portions of said waves and energy losses sustained by said waves through action of said retarding surface are negligible; and portions of said conductive strip extending from the lower to the upper edge of said strip, said portions forming the borders of said slots and having upwardly extending centerlines which, where they lie between ones of said slots, are free from recurvature.

19. In combination with an antenna including a hollow waveguide having a wall and provided with radiating means operable for radiating electromagnetic energy from within said guide to locations outside said wall, a retarding surface comprising: a substantially smooth conductive strip having a horizontally disposed longitudinal axis and an end, said end lying contiguous to said radiating means and said strip extending therefrom outwardly of said wall; a face of said strip adjacent said radiating means and extending along said axis, said face being swept by respective ends of waves which have been radiated via said radiating means; and means effecting only negligible energy losses in said waves and retarding said ends of said waves behind other portions of said waves, said means comprising surface discontinuities extending athwart said face of said strip and distributed along the longitudinal axis thereof, said strip being electro-magnetically exposed to free space above and below said strip.

References Cited in the file of this patent

UNITED STATES PATENTS

| | | |
|---|---|---|
| 2,532,919 | Johnson | Dec. 5, 1950 |
| 2,689,303 | Risser | Sept. 14, 1954 |
| 2,770,781 | Robertson-Shersby-Harvie et al. | Nov. 13, 1956 |

OTHER REFERENCES

"Omniguide Antenna" R.C.A. Review March 1956.